(12) United States Patent
Liotta, Jr. et al.

(10) Patent No.: US 7,232,875 B1
(45) Date of Patent: Jun. 19, 2007

(54) PREPARATION OF COMB-BRANCHED POLYMERS

(75) Inventors: Frank J. Liotta, Jr., Downingtown, PA (US); Edward T. Shawl, Wallingford, PA (US)

(73) Assignee: Lyondell Chemical Technology, L.P., Greenville, DE (US)

( * ) Notice: Subject to any disclaimer, the term of this patent is extended or adjusted under 35 U.S.C. 154(b) by 0 days.

(21) Appl. No.: 11/430,758

(22) Filed: May 9, 2006

(51) Int. Cl.
*C08F 220/64* (2006.01)
*C08F 118/02* (2006.01)

(52) U.S. Cl. .................. 526/318.3; 526/319; 526/240; 524/5; 560/183

(58) Field of Classification Search ............. 526/318.3, 526/319, 240; 524/5; 560/183
See application file for complete search history.

(56) References Cited

U.S. PATENT DOCUMENTS

| 4,814,014 A | 3/1989 | Arfaei .......................... 106/90 |
| 5,834,576 A | 11/1998 | Nagano et al. .......... 526/318.3 |
| 6,214,958 B1 * | 4/2001 | Le-Khac et al. ......... 526/318.3 |
| 6,582,510 B1 * | 6/2003 | Schwartz .................... 106/499 |

\* cited by examiner

*Primary Examiner*—David W. Wu
*Assistant Examiner*—M. Bernshteyn
(74) *Attorney, Agent, or Firm*—Shao-Hua Guo

(57) ABSTRACT

A comb-branched polymer is disclosed. The polymer comprises recurring units of an unsaturated carboxylic monomer, an oxypropylene-rich poly(oxyethylene-oxypropylene) macromonomer and an oxyethylene-rich poly(oxyethylene-oxypropylene) macromonomer. The comb-branched polymer can be used as a water reducing agent in cement. It gives significantly lower air entrainment in cement admixture.

20 Claims, No Drawings

PREPARATION OF COMB-BRANCHED POLYMERS

FIELD OF THE INVENTION

The invention relates to comb-branched polymers. More particularly, the invention relates to comb-branched polymers that have reduced air entrainment in cement admixture.

BACKGROUND OF THE INVENTION

Water reducing agents reduce the amount of water needed in cement admixtures, while maintaining good processing ability and consistency. Lignin sulfonates and naphthalene sulfonate-formaldehyde condensates have long been used as water reducing agents. These conventional water reducing agents are readily available and relatively inexpensive. However, they are used in high doses.

In contrast, newly developed polymeric water reducing agents offer high performance but are more expensive to make. U.S. Pat. No. 4,814,014, for example, teaches to graft ethylenically unsaturated monomers onto a polyether. The graft copolymer is used at a low dosage. Unfortunately, it is contaminated with a large portion of non-grafted polyether and ethylenic homopolymer. Because these non-grafted polymers do not function as water reducing agents, they reduce the effectiveness of the product.

Comb-branched copolymers of acrylic acid and polyether macromonomers have been used as high performance water reducing agents (see U.S. Pat. No. 5,834,576). The comb-branched copolymers have more uniform structures compared to the graft polymers of U.S. Pat. No. 4,814,014. Consequently, they have higher water reducing ability. An added advantage of these copolymers is the improved ability to maintain "slump." Slump retention is the workable time after the cement admixture is mixed. Commonly used polyether macromonomers include acrylates, methacrylates, and allyl ethers of polyether.

Methods for preparing comb-branched copolymers of carboxylic monomers and polyether macromonomers are known and relatively simple. In general, free radical polymerization of a polyether macromonomer with a carboxylic monomer forms a comb-branched copolymer. A continuous process for making comb-branched polymer is described in U.S. Pat. No. 6,214,958. The comb-branched polymer made thereby performs better as water reducing agent in cement compared to that made by a batch process.

One practical issue for using comb-branched polymer in cement admixture is that comb-branched polymers entrain air. Managing the air entrainment is often difficult. Hence, new comb-branched polymers are needed. Ideally, the comb-branched polymer has reduced air entrainment.

SUMMARY OF THE INVENTION

The invention is a new comb-branched polymer. The comb-branched polymer comprises recurring units of an unsaturated carboxylic monomer, a poly(oxypropylene-oxyethylene) macromonomer having an oxypropylene content greater than or equal to 50 wt %, and a poly(oxypropylene-oxyethylene) macromonomer having an oxyethylene content greater than 50 wt %. Surprisingly, the comb-branched polymer of the invention gives significantly reduced air entrainment in cement admixtures compared to the known comb-branched polymers.

DETAILED DESCRIPTION OF THE INVENTION

The invention is a comb-branched polymer that gives significantly reduced air entrainment in cement admixtures. The comb-branched polymer comprises recurring units of an unsaturated carboxylic monomer, an oxypropylene-rich poly(oxyethylene-oxypropylene) macromonomer, and an oxyethylene-rich poly(oxyethylene-oxypropylene) macromonomer.

Conventional comb-branched polymers for the use in cement as water reducing agent comprise recurring units of an unsaturated carboxylic monomer and a poly(oxyethylene-oxypropylene) macromonomer. The poly(oxyethylene-oxypropylene) macromonomer used often is rich in oxyethylene recurring units which provide water solubility and compatibility with cement. Although the conventional comb-branched polymers are effective as water reducing agents in cement admixtures, they often cause air entrainment.

This invention provides a solution to the air entrainment problem associated with the use of conventional comb-branched polymer water reducing agents in cement admixtures. We found that the comb-branched polymer that comprises both recurring units of an oxyethylene-rich macromonomer and an oxypropylene-rich macromonomer gives significantly reduced air entrainment in cement admixtures compared to the conventional comb-branched polymer water reducing agents.

Suitable macromonomers for making the comb-branched polymer of the invention include poly(oxyethylene-oxypropylene) random or block copolymers attached with a C=C double that is free-radically polymerizable with the unsaturated carboxylic monomer. Examples of suitable macromonomers are poly(oxyethylene-oxypropylene) acrylates, poly(oxyethylene-oxypropylene) methacrylates, poly(oxyethylene-oxy-propylene) maleates, poly(oxyethylene-oxypropylene) fumarates, poly(oxyethylene-oxypropylene) allyl ethers, the like, and mixtures thereof.

Suitable macromonomers preferably have a number average molecular weight within the range of about 500 to about 7,000. More preferably, the macromonomers have a number average molecular weight within the range of about 1,000 to about 5,000.

Optionally, the macromonomers can comprise other oxyalkylene units such as oxybutylene. The other oxyalkylene units are preferably present in an amount less than 50 wt % of the total macromonomer composition. More preferably, the other oxyalkylene units are present in an amount less than 25 wt % of the total macromonomer composition.

Suitable oxypropylene-rich poly(oxyethylene-oxypropylene) macro-monomer has an oxypropylene/oxyethylene weight ratio greater than or equal to 1. Preferably, the oxypropylene-rich poly(oxyethylene-oxypropylene) macromonomer has an oxypropylene/oxyethylene weight ratio within the range of about 60/40 to about 95/5. More preferably, the oxypropylene-rich poly(oxyethylene-oxypropylene) macromonomer has an oxy-propylene/oxyethylene weight ratio within the range of about 70/30 to about 90/10. Most preferably, the oxypropylene-rich poly(oxyethylene-oxy-propylene) macromonomer has an oxypropylene/oxyethylene weight ratio within the range of about 75/25 to about 85/15.

Suitable oxyethylene-rich poly(oxyethylene-oxypropylene) macro-monomer has an oxyethylene/oxypropylene weight ratio greater than 1. Preferably, the oxyethylene-rich poly(oxyethylene-oxypropylene) macro-monomer has an oxyethylene/oxypropylene weight ratio within the range of about 60/40 to about 90/10. More preferably, the oxyethylene-rich poly(oxyethylene-oxypropylene) macromonomer has an oxyethylene/oxy-propylene weight ratio within the range of about 65/35 to about 75/25.

Preferably, the weight ratio of recurring units of oxypropylene-rich macromonomer/oxyethylene-rich macromonomer is within the range of about 1/100 to about 50/100. More preferably, the weight ratio of recurring units of oxypropylene-rich macromonomer/oxyethylene-rich macromonomer is within the range of about 2/100 to about 25/100.

Suitable unsaturated carboxylic monomer include any monomers having a free-radically polymerizable C=C double bond and a carboxylic functional group. Preferably, the unsaturated carboxylic monomer is selected from the group consisting of acrylic acid, methacrylic acid, maleic anhydride or acid, sodium acrylate, sodium methacrylate, sodium maleate, ammonium acrylate, ammonium methacrylate, ammonium maleate, potassium acrylate, potassium methacrylate, potassium maleate, the like, and mixtures thereof. More preferably, the unsaturated carboxylic monomer is selected from the group consisting of acrylic acid, sodium acrylate, potassium acrylate, ammonium acrylate, the like, and mixtures thereof.

Preferably, the recurring unit of the unsaturated carboxylic acid is present in an amount within the range of about 1 wt % to about 99 wt % based on the total composition of the comb-branched polymer. More preferably, the recurring unit of the unsaturated carboxylic acid is present in an amount within the range of about 1 wt % to about 75 wt % based on the total composition of the comb-branched polymer. Most preferably, the recurring unit of the unsaturated carboxylic acid is present in an amount within the range of about 2 wt % to about 20 wt % based on the total composition of the comb-branched polymer.

Optionally, the comb-branched polymer comprises recurring units of a fourth monomer. The fourth monomer is preferably selected from vinyl aromatics, vinyl halides, vinyl ethers, vinyl esters, vinyl pyrrolidinones, conjugated dienes, unsaturated sulfonic acids, unsaturated phosphonic acids, and the like, and mixtures thereof. The amount of fourth monomer used depends on the required physical properties of the comb-branched copolymer product but is preferably less that 50% by weight of the total amount of monomers.

The comb-branched polymer of the invention can be made by any known free radical polymerization process, including batch, semi-batch, and continuous process. It can be made by bulk, solution, emulsion, and suspension polymerization. Preferably, the comb-branched polymer is made by a continuous solution polymerization process.

U.S. Pat. No. 6,214,958, the teachings of which are incorporated herein by reference, teaches a continuous process.

The continuous process of the invention uses streams of a monomer, an initiator, and, optionally, a chain transfer agent.

The monomer stream contains the unsaturated carboxylic monomer, the oxypropylene-rich and oxyethylene-rich macromonomers, and optionally a fourth monomer as discussed above. Optionally, the oxypropylene-rich macromonomer and the oxyethylene-rich macromonomer can form separate streams. Either one of the streams can be combined with the unsaturated carboxylic monomer.

Optionally, the monomer streams also includes a solvent. The solvent is used to dissolve the monomer, to assist heat transfer of the polymerization, or to reduce the viscosity of the final product. The solvent is preferably selected from water, alcohols, ethers, esters, ketones, aliphatic hydrocarbons, aromatic hydrocarbons, halides, and the like, and mixtures thereof. Selections of solvent type and amount are determined by the polymerization conditions including reaction temperature. Water and alcohols, such as methanol, ethanol, and isopropanol, are preferred.

The initiator stream contains a free radical initiator. The initiator is preferably selected from persulfates, hydrogen peroxide, organic peroxides and hydroperoxides, azo compounds, and redox initiators such as hydrogen peroxide plus ferrous ion. Persulfates, such as ammonium and potassium persulfate, are preferred.

Optionally, the initiator stream contains a solvent. The solvent is used to dissolve or dilute the initiator, to control the polymerization rate, or to aid heat or mass transfer of the polymerization. Suitable solvents are described above. Selections of solvent type and amount are determined by the nature of the initiator and the polymerization conditions. Water and alcohols such as methanol, ethanol, and isopropanol are preferred when persulfate is used as initiator.

The monomers and initiator streams optionally include a chain transfer agent. Suitable chain transfer agent includes alkyl amines, alkyl sulfides, alkyl disulfides, carbon tetrahalides, allyl ethers, and mercaptans. Mercaptans, such as butyl mercapan, mercaptoacetic and mercaptopropionic acids, are preferred.

Under some conditions, it is preferred to add the optional chain transfer agent in a separate stream. This is particularly desirable when the chain transfer agent causes decomposition of the initiator or polymerization of the monomer once it is mixed with those components. This is particularly important in a large, commercial scale because these reactions can cause safety problems.

Optionally, the chain transfer agent stream contains a solvent that is used to dissolve or dilute the chain transfer agent. Suitable solvents include water, alcohols, ethers, esters, ketones, aliphatic and aromatic hydrocarbons, halides, and the like, and mixtures thereof. Selections of solvent type and amount are determined by the nature of the chain transfer agent and the polymerization conditions. Water and alcohols, such as methanol, ethanol, and isopropanol, are preferred.

The monomer streams, initiator stream, and optional chain transfer agent stream are polymerized in a reaction zone. The reaction temperature is preferably kept essentially constant during the polymerization. The temperature is determined by a combination of factors including the desired molecular weight of the comb-branched polymer product, the initiator type and concentration, the monomer type and concentration, and the solvent used. The reaction is performed at a temperature within the range of about –20° C. to about 150° C., preferably, within the range of about 0° C. to about 100° C. More preferred is the range of about 20° C. to about 90° C. Most preferred is the range of about 40° C. to about 70° C.

The addition rate of each stream depends on the desired concentration of each component, the size and shape of the reaction zone, the reaction temperature, and many other considerations. In general, the streams flow into the reaction zone at rates that keep the initiator concentration within the range of about 0.01% to about 5% by weight, and the chain transfer agent concentration within the range of about 0.1% to about 1.5% by weight.

The reaction zone is where the polymerization takes place. It can be in the form of a tank reactor, a tubular reactor, or any other desirably shaped reactor. The reaction zone is preferably equipped with a mixer, a heat transfer device, an inert gas source, and any other suitable equipment.

As the streams are polymerized in the reaction zone, a polymer stream is withdrawn. The flow rate of the polymer stream is such that the reaction zone is mass-balanced, meaning that the amount of material that flows into the reaction zone equals to the amount of material withdrawn from the reaction zone. The polymer stream is then collected.

The polymerization can also be performed in a multiple zone process. A multiple zone process is similar to the process discussed above except that more than one reaction zone is used. In a multiple zone process, a first polymer stream is withdrawn from a first reaction zone and transferred into a second reaction zone where the polymerization continues. A second polymer stream is withdrawn from the second reaction zone. More than two reaction zones can be used if desirable. The reaction temperature in the second reaction zone can be the same as or different from the first reaction zone. A multiple zone process can enhance monomer conversion and increase efficiency of the process. Usually, in the first polymer stream, the monomer conversion is within the range of about 65% to 85% by weight. The second reaction zone preferably brings the monomer conversion to 90% or greater.

The invention includes a cement composition that comprises the comb-branched polymer of the invention. The comb-branched polymer can be used as a water reducing agent in the cement. In ASTM C494-92, a water reducing admixture is defined as an admixture that reduces the quantity of mixing water required to produce cement of a given consistency by at least 5%. Preferably, the quantity of mixing water required to produce cement of a given consistency is reduced by at least 25%.

The cements with which the comb-branched polymer of the invention may be used are hydraulic cements, meaning cements which, when made into a paste with water, set and harden as a result of chemical reactions between the water and cement. Suitable cements include ordinary, quick-hardening, and moderate-heat Portland cements, alumina cement, blast-furnace slag cement, and flash cement. Of these, Portland cements of the ordinary and quick-hardening types are particularly desirable.

The quantity of the comb-branched polymer used may vary with factors such as the relative amount of the recurring units of the macromonomers to the recurring units of the unsaturated carboxylic monomer, the ratio of the oxypropylene-rich macromonomer/the oxyethylene-rich macromonomer, and the compositions of the macromonomers. The quantity to be used in accordance with the invention is usually in the range of 0.01–10%, preferably 0.05 to 2%, based on the weight of dry cement. The quantity of water to be used for setting the cement is not critical; generally weight ratios of water to cement in the range 0.25:1 to 0.7:1, preferably 0.3:1 to 0.5:1 are satisfactory. Where desired, an aggregate such as pebbles, gravel, sand, pumice, or fired pearlite or mixtures thereof may be employed in conventional amounts.

Advantageously, the comb-branched polymer of the invention gives significantly reduced air entrainment compared to the known comb-branched polymer water reducing agent.

The cement composition of the invention optionally comprises other additives. Among the optionally additives are conventional hardening accelerators, e.g., metal chlorides such as calcium chloride and sodium chloride, metal sulfates, such as sodium sulfate, and organic amines such as triethanol-amine; ordinary hardening retarders, e.g., alcohols, sugars, starch and cellulose; reinforcing-steel corrosion inhibitors such as sodium nitrate and calcium nitrite; other water reducing agents such as ligninsulfonic acid salts, as well as salts of oxycarboxylic acid and formalin condensates of naphthalenesulfonic acid; shrinkage reducing agents; strength enhancers such as triisopropylamine; antifoaming agents such as tributyl phosphate; and the like. The quantity of such an optional ingredient or ingredients is usually 0.1–6% by weight of the cement.

The manner of adding the comb-branched polymer of the invention to the cement may be the same as with ordinary cement admixtures. For example, the comb-branched polymer can be admixed with a suitable proportion of water and the resulting solution is mixed with cement and aggregate. As an alternative, a suitable amount of the comb-branched polymer may be added when cement, aggregate and water are mixed. Another method of introducing the comb-branched polymer is to add it to the dry cement prior to or after grinding the cement clinker.

The concrete of the invention may be applied in conventional ways. For example, it may be trowelled, filled in forms, applied by spraying, or injected by means of a caulking gun. Hardening or curing of the concrete and the like may be by any of the air drying, wet air, water and assisted (steam, autoclave, etc.) curing techniques. If desired, two or more such techniques may be combined. The respective curing conditions may be the same as in the past.

The following examples merely illustrate the invention. Those skilled in the art will recognize many variations that are within the spirit of the invention and scope of the claims.

EXAMPLE 1

Preparation of Comb-Branched Polymer of the Invention and its Performance in Cement Admixture The reaction is carried out in a 1 liter reaction kettle equipped with a stirrer, a temperature controller, a heating device, a nitrogen purge device and a product outlet. The outlet tube is set so that the reactor holds about 320 ml of material. There are three inlet addition pumps, one primary monomer pump for the mixture of monomers in water, one for the initiator, and one for the chain transfer agent. Optionally there is a secondary monomer addition pump. The product outlet overflows to a second reactor which is equipped with a stirrer, a temperature controller, a heating device and a nitrogen purge device. The second reactor is sized to collect all product produced after the reaction has reached steady state. The reactor is charged with 75 mL of water to cover the stirrer and the reactor head space is then purged with nitrogen for about 20 min. A mixture of an oxyethylene-rich macromonomer (a methacrylate of an oxyethylene/oxypropylene random copolymer having an ethylene/oxypropylene ratio of 70/30 by weight and a number average molecular weight of about 3000, 1638 g, 0.55 mol), methacrylic acid (149 g, 1.73 mol), and water (1625 g) is charged to the primary monomer feed pump. An aqueous solution of 1.25 wt % ammonium persulfate is charged to the initiator pump and a solution of 2.2 wt % 3-mercaptopropionic acid is charged to the chain transfer agent pump. An oxypropylene-rich macromonomer (methacrylate of an oxyethylene/oxypropylene random copolymer having an oxyethylene/oxypropylene ratio of 20/80 by weight and a number average molecular weight of about 3000, 182 g, 0.061 mol) is charged next to the secondary monomer addition pump. The reactor is heated to 65° C. and then the feed pumps are started with a feed rate of 266 g/hr for the primary monomer feed, 13.4 ml/hr for the secondary monomer feed, 31.6 ml/hr for the initiator feed and 24 ml/hr for the chain transfer agent feed. The reaction temperature is maintained at 65° C. and there is a continuous nitrogen purge of the reactor. The reactor overflow is diverted to a separate collector for the first five hours until the reactor has reached a steady state condition. Product is then collected in the second reactor for about 5 hours. At the end of that period the reactor contents in the second reactor is heated at 65° C. for another two hours to complete the reaction.

Performance of the product in a mortar mix is measured by testing for slump according to ASTM C-143 modified for a mortar test. The slump cone is scaled to one-half size with a height of 152 mm or 6 in, a bottom diameter of 100 mm and a top diameter of 54 mm. Portland cement, Type I/II, is used. The cement is obtained from Holcim. The mix design uses 1070 g cement, 2700 g of a graded sand and water at a water/cement ratio of 0.380 corresponding to about 25% water cut. Both slump and flow are recorded. Air content is measured using ASTM Method C 185. For the product made in this example, the admixture dose is 0.100% solids/cement giving a slump of 118 mm and a flow of 196 mm. Air content without defoamer is 5.4% as shown in Table 1.

EXAMPLE 2

Preparation of Comb-Branched Polymer of the Invention and its Performance in Cement Admixture A comb-branched polymer is prepared according to Example 1 except all the monomers are combined in the primary monomer feed pump so the secondary monomer pump is not used. The monomer feed pump is run as 280 g/hr.

The cement is obtained either from Holcim (a) and (b) or from a local building materials store (c). The local material has higher alkali content. Higher alkali cements are typically more prone to higher air generation with comb-branched polymers so some defoamer is added with this cement. The results (see Table 1) indicate that the comb-branched polymer of the invention gives low air entrainment and that the air content does not increase with time. The comparative examples, C6(b), C6(c), and C6(d), show an increase in air content with time.

EXAMPLE 3

Preparation of Comb-Branched Polymer of the Invention and its Performance in Cement Admixture A comb-branched polymer is prepared according Example 1 except the feed rate for the chain transfer agent pump is reduced to 16 ml/hr. The polymer is evaluated with local cement. The results (see Table 1) indicate that the comb-branched polymer of the invention gives low air entrainment and that the air content does not increase with time.

EXAMPLE 4

Preparation of Comb-Branched Polymer of the Invention and its Performance in Cement Admixture A comb-branched polymer is prepared according to Example 2 but a different oxypropylene-rich macromonomer is used. A mixture of an oxyethylene-rich macromonomer (methacrylate of an oxyethylene/oxypropylene random copolymer having an oxyethylene/oxypropylene ratio of 70/30 by weight and a number average molecular weight of about 3000, 720 g, 0.24 mol), an oxypropylene-rich macromonomer (methacrylate of an oxyethylene/oxypropylene random copolymer having and oxyethylene/oxy-propylene ratio of 50/50 by weight and a number average molecular weight of about 3000, 80 g, 0.027 mol), methacrylic acid (65.5 g, 0.76 mol), and water (712 g) is charged to the primary monomer feed pump. Water (75 ml) is charged to the reactor. The reactor is heated to 65° C. and then the feed pumps are started with a feed rate of 280 g/hr for the main monomer feed, 31.6 ml/hr for the initiator feed and 12 ml/hr for the chain transfer agent feed. The reaction temperature is maintained at 65° C. and there is a continuous nitrogen purge of the reactor. The reactor overflow is diverted to a separate collector for the first five hours until the reactor has reached steady state. Product is then collected in the second reactor for about 30 min. At the end of that period the product in the second reactor is heated for another three hours to complete the reaction. Mortar testing as described in Example 1 at a dose of 0.100% solids/cement gives a slump of 114 mm and a flow of 164. The air entrainment test results (see Table 1) indicate that the comb-branched polymer of the invention gives low air entrainment.

COMPARATIVE EXAMPLE 5

Preparation of Comparative Comb-Branched Polymer and its Performance in Cement Admixture The reactor is a 250 ml 4-neck round bottom flask equipped with a stirrer, a temperature controller, a nitrogen purge device, a monomer addition pump, an initiator addition pump, a chain transfer agent addition pump and a product outlet tube. The outlet tube is set to give a reactor volume of about 125 ml. A mixture of a methacrylate of an oxyethylene/oxypropylene random copolymer having an oxy-ethylene/oxypropylene ratio of 50/50 by weight and a number average molecular weight of about 2000 (1300 g, 0.65 mol), acrylic acid (188 g, 2.6 mol), and water (912 g) is charged to the monomer feed tank. A solution of 2.5 wt % ammonium persulfate in water is charged to the initiator feed pump and a solution of 4.4 wt % 3-mercaptopropionic acid is charged to the chain transfer agent feed pump. Water (40 ml) is charged to the reactor. The reactor is heated to 60° C. and then the feed pumps are started with a feed rate of 43.3 g/hr for the monomer feed, 17.8 ml/hr for the initiator feed and 12.66 ml/hr for the chain transfer agent feed. The reaction temperature is maintained at 60° C. and there is a continuous nitrogen purge of the reactor. The reactor overflow is diverted to a separate collector for the first 4.5 hours until the reactor has reached a steady state condition. Product is then collected in the second reactor for about 1 hour. At the end of that period the contents of the second reactor are heated for another three hours to complete the reaction. Mortar testing at a dose of 0.13% solids/cement gives a slump of 122 mm and a flow of 222 mm. The air entrainment results (see Table 1) indicate that the comparative comb-branched polymer gives significantly higher air entrainment than the comb-branched polymer of the invention.

COMPARATIVE EXAMPLE 6

Preparation of Comparative Comb-Branched Polymer and its Performance in Cement Admixture The reactor described in Example 1 is used except there is no secondary monomer pump. A mixture of a methacrylate of an oxyethylene/oxypropylene random copolymer having an oxyethyle ne/oxypropylene ratio of 70/30 by weight and a number average molecular weight of about 3000 (1933 g, 0.64 mol), methacrylic acid (156.9 g, 1.82 mol), and water (1606 g) is charged to the monomer feed pump. Water (50 ml) is charged to the reactor. The reactor is heated to 65° C. and then the feed pumps are started with a feed rate of 370 g/hr for the monomer feed, 41.8 ml/hr for the initiator feed and 36 ml/hr for the chain transfer agent feed. The reaction temperature is maintained at 65° C. and there is a continuous nitrogen purge of the reactor. The reactor overflow is diverted to a separate collector for the first three hours until the reactor has reached a steady state condition. Product is then collected in the second reactor for about five hours. At the end of that period the contents of the second reactor are heated for another two hours to complete the reaction. The mortar testing as described in Example 1 at a dose of 0.100% solids/cement gives a slump of 120 mm and a flow of 196 mm. The air entrainment test results (see Table 1) indicate that the comparative comb-branched polymer gives significantly higher air entrainment than the comb-branched polymer of the invention.

TABLE 1

AIR ENTRAINMENT OF CEMENT ADMIXTURES

| Ex. No. | Cement Type | De-foamer* ppm | Dose of Comb-branched Polymer % | Air Entrainment % | | |
|---|---|---|---|---|---|---|
| | | | | 10 min | 20 min | 30 min |
| 1 | Holcim | 0 | 0.100 | 5.4 | — | — |
| 2(a) | Holcim | 0 | 0.100 | 6.1 | — | — |
| 2(b) | Holcim | 140 | 0.100 | 5.3 | 5.1 | 4.9 |
| 2(c) | Local | 224 | 0.125 | 6.9 | 7.0 | 7.0 |
| 3 | Local | 210 | 0.130 | 5.7 | 5.9 | 5.3 |
| 4 | Holcim | 0 | 0.105 | 5.4 | — | — |
| C5(a) | Holcim | 0 | 0.130 | 16.0 | — | — |
| C5(b) | Local | 241 | 0.135 | 9.1 | 11.0 | 12.2 |
| C6(a) | Holcim | 0 | 0.105 | 10.5 | — | — |
| C6(b) | Holcim | 140 | 0.105 | 7.2 | 9.3 | 10.5 |
| C6(c) | Local | 218 | 0.128 | 9.8 | 10.7 | 12.1 |
| C6(d) | Local | 219 | 0.138 | 10.4 | 12.8 | 14.4 |

*Dow Corning 2210, dose is ppm based on the cement.

We claim:

1. A comb-branched polymer which comprises recurring units of (a) an unsaturated carboxylic monomer, (b) an oxypropylene-rich poly(oxyethylene-oxypropylene) macromonomer and (c) an oxyethylene-rich poly(oxyethylene-oxypropylene) macromonomer.

2. The polymer of claim 1, wherein the macromonomer (b) has an oxypropylene/oxyethylene weight ratio within the range of about 50/50 to about 95/5.

3. The polymer of claim 1, wherein the macromonomer (b) has an oxypropylene/oxyethylene weight ratio within the range of about 70/30 to about 90/10.

4. The polymer of claim 1, wherein the macromonomer (b) has an oxypropylene/oxyethylene weight ratio within the range of about 75/25 to about 85/15.

5. The polymer of claim 1, wherein the macromonomer (c) has an oxyethylene/oxypropylene weight ratio within the range of about 60/40 to about 90/10.

6. The polymer of claim 1, wherein the macromonomer (c) has an oxyethylene/oxypropylene weight ratio within the range of about 65/35 to about 75/25.

7. The polymer of claim 1, wherein the macromonomers (b) and (c) are independently selected from the group consisting of poly(oxyethylene-oxypropylene) acrylates, poly(oxyethylene-oxy-propylene) methacrylates, poly(oxyethylene-oxypropylene) maleates, poly(oxyethylene-oxypropylene) fumarates, poly(oxyethylene-oxypropylene) allyl ethers, and mixtures thereof.

8. The polymer of claim 1 wherein the macromonomers (b) and (c) are independently selected from the group consisting of poly(oxyethylene-oxypropylene) acrylates, poly(oxyethylene-oxy-propylene) methacrylates, and mixtures thereof.

9. The polymer of claim 1, wherein the unsaturated carboxylic monomer is selected from the group consisting of acrylic acid, methacrylic acid, maleic anhydride or acid, sodium acrylate, sodium methacrylate, sodium maleate, ammonium acrylate, ammonium methacrylate, ammonium maleate, potassium acrylate, potassium methacrylate, potassium maleate, and mixtures thereof.

10. The polymer of claim 1, wherein the unsaturated carboxylic monomer is selected from the group consisting of acrylic acid, sodium acrylate, potassium acrylate, ammonium acrylate, and mixtures thereof.

11. The polymer of claim 1 having a content of the component (a) within the range of about 2 wt % to about 20 wt % based on the total polymer composition.

12. The polymer of claim 1, which has a weight ratio of macromonomer (b) to macromonomer (c) within the range of about 1/100 to about 50/100.

13. The polymer of claim 12, wherein the weight ratio of macromonomer (b) to macromonomer (c) is within the range of about 2/100 to about 20/100.

14. The polymer of claim 1, wherein the macromonomers (b) and (c) independently have number average molecular weights within the range of about 500 to about 7,000.

15. The polymer of claim 1, wherein the macromonomers (b) and (c) have number average molecular weights within the range of about 1,000 to about 5,000.

16. A process for making the polymer of claim 1, said process comprising polymerizing a mixture comprising components (a), (b), and (c) with a free radical initiator and an optional chain transfer agent.

17. A continuous polymerization process of claim 16.

18. A batch polymerization of claim 16.

19. A semi-batch polymerization of claim 16.

20. A cement composition comprising the polymer of claim 1.

* * * * *